United States Patent
Ogata et al.

(10) Patent No.: US 11,796,948 B2
(45) Date of Patent: Oct. 24, 2023

(54) MEASUREMENT DEVICE AND IMAGE FORMING APPARATUS

(71) Applicant: FUJIFILM Business Innovation Corp., Tokyo (JP)

(72) Inventors: Kenta Ogata, Kanagawa (JP); Kouhei Yukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 144 days.

(21) Appl. No.: 17/458,579

(22) Filed: Aug. 27, 2021

(65) Prior Publication Data

US 2022/0371349 A1   Nov. 24, 2022

(30) Foreign Application Priority Data

May 20, 2021   (JP) ................................. 2021-085627

(51) Int. Cl.
  *G03G 5/00*   (2006.01)
  *B41J 11/00*   (2006.01)
  *G03G 15/00*   (2006.01)

(52) U.S. Cl.
  CPC ........ *G03G 15/5029* (2013.01); *B41J 11/009* (2013.01); *G03G 2215/00637* (2013.01); *G03G 2215/00717* (2013.01); *G03G 2215/00742* (2013.01); *G03G 2215/00763* (2013.01)

(58) Field of Classification Search
  CPC ..... G03G 15/5029; G03G 2215/00637; G03G 2215/00717; G03G 2215/00742; G03G 2215/00763; B41J 11/009
  See application file for complete search history.

(56) References Cited

U.S. PATENT DOCUMENTS

| | | | | |
|---|---|---|---|---|
| 8,774,653 | B2 * | 7/2014 | Iwasa ................ | G03G 15/5029 |
| | | | | 399/45 |
| 8,875,581 | B2 | 11/2014 | Nakamura et al. | |
| 10,059,547 | B2 | 8/2018 | Hayashi et al. | |
| 11,353,815 | B2 * | 6/2022 | Monde ............... | G03G 15/5029 |
| 11,573,516 | B2 * | 2/2023 | Ogata ................ | G03G 15/5037 |

(Continued)

FOREIGN PATENT DOCUMENTS

| | | | | |
|---|---|---|---|---|
| JP | 2002108068 A | * | 4/2002 | |
| JP | 2009029622 A | * | 2/2009 | .............. B65H 7/02 |

(Continued)

OTHER PUBLICATIONS

"Search Report of Europe Counterpart Application", dated Mar. 1, 2022, pp. 1-8.

*Primary Examiner* — Ryan D Walsh
(74) *Attorney, Agent, or Firm* — JCIPRNET (57) ABSTRACT

A measurement device includes a measurement unit that measures a physical property of a measurement target by causing the measurement target to vibrate through an application of an ultrasonic wave, the measurement unit including a first mode that measures the physical property using a first burst wave sensitive in a first predetermined range of physical property values and a second mode that measures the physical property using a second burst wave sensitive in a second range of physical property values different from the first range, and a control unit that controls the measurement unit to execute at least one of the first mode and the second mode.

8 Claims, 8 Drawing Sheets

(56) References Cited

U.S. PATENT DOCUMENTS

| | | | |
|---|---|---|---|
| 2017/0123359 A1* | 5/2017 | Monde | G03G 15/5029 |
| 2018/0314199 A1* | 11/2018 | Matsuda | G03G 15/5029 |
| 2019/0064718 A1* | 2/2019 | Mitsui | B65H 7/20 |
| 2019/0092592 A1* | 3/2019 | Suzuki | B65H 5/068 |
| 2019/0265607 A1* | 8/2019 | Ishimoto | G03G 15/6594 |
| 2020/0122942 A1* | 4/2020 | Izumiya | G03G 15/5029 |
| 2020/0192261 A1* | 6/2020 | Ogata | G03G 15/5062 |
| 2020/0209794 A1* | 7/2020 | Azami | G03G 15/5029 |
| 2020/0240843 A1 | 7/2020 | Kanai et al. | |
| 2022/0179347 A1* | 6/2022 | Maruyama | G03G 15/5029 |
| 2022/0371349 A1* | 11/2022 | Ogata | G03G 15/5029 |
| 2022/0373326 A1* | 11/2022 | Ogata | G01B 17/02 |

FOREIGN PATENT DOCUMENTS

| | | | | |
|---|---|---|---|---|
| JP | 2010049285 A | * | 3/2010 | G06F 11/008 |
| JP | 2012145819 A | * | 8/2012 | |
| JP | 2017210349 | | 11/2017 | |
| JP | 2018135201 | | 8/2018 | |
| JP | 2019045648 A | * | 3/2019 | G03G 15/2017 |
| JP | 2019119578 | | 7/2019 | |
| JP | 2019124793 | | 7/2019 | |

* cited by examiner

MEASUREMENT DEVICE AND IMAGE FORMING APPARATUS

CROSS-REFERENCE TO RELATED APPLICATIONS

This application is based on and claims priority under 35 USC 119 from Japanese Patent Application No. 2021-085627 filed May 20, 2021.

BACKGROUND

(i) Technical Field

The present disclosure relates to a measurement device and an image forming apparatus.

(ii) Related Art

Japanese Unexamined Patent Application Publication No. 2017-210349 discloses a sheet conveyance apparatus provided with: an emission unit disposed to face a first surface of a sheet in a conveyance path of the sheet along which a first sheet and a second sheet smaller than the first sheet are conveyed as the sheet, and configured to emit an ultrasonic wave; a reception unit provided to face a second surface on the opposite side from the first surface of the sheet in the conveyance path, and configured to receive the ultrasonic wave; a measurement unit configured to measure a reception strength treated as the strength of the ultrasonic wave received by the reception unit; and a determination unit configured to determine, on the basis of the reception strength measured by the measurement unit, a conveyance state of the sheet in a region where the sheet is held between the emission unit and the reception unit on the conveyance path.

In the sheet conveyance apparatus, the determination unit determines, on the basis of the reception strength measured by the measurement unit at each of multiple times after the ultrasonic wave is emitted, a first state in which a single first sheet is being conveyed, a second state in which a stack of multiple first sheets is being conveyed, and a third state in which the second sheet is being conveyed as the conveyance state. The multiple time includes a first time at which the reception unit receives a direct wave, that is, a component of the ultrasonic wave that travels from the emission unit, passes through the sheet existing in the region, and propagates to the reception unit, and a second time at which the reception unit does not receive the direct wave from the reception unit but instead receives a diffracted wave, that is, a component of the ultrasonic wave that travels from the emission unit, bypasses the second sheet, and propagates to the reception unit.

SUMMARY

A measurement device that measures a physical property (for example, the basis weight) of a measurement target by causing the measurement target to vibrate through the application of an ultrasonic wave is conceivable. In such a measurement device, in the case of using a single type of burst wave as the ultrasonic wave, because a burst wave is only sensitive in a specific range of physical property values, the physical property of the measurement target may not be measured precisely in some cases.

Aspects of non-limiting embodiments of the present disclosure relate to enabling a physical property of a measurement target to be measured with high precision compared to a configuration that only uses a single type of burst wave.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a measurement device including a measurement unit that measures a physical property of a measurement target by causing the measurement target to vibrate through an application of an ultrasonic wave, the measurement unit including a first mode that measures the physical property using a first burst wave sensitive in a first predetermined range of physical property values and a second mode that measures the physical property using a second burst wave sensitive in a second range of physical property values different from the first range, and a control unit that controls the measurement unit to execute at least one of the first mode and the second mode.

BRIEF DESCRIPTION OF THE DRAWINGS

An exemplary embodiment of the present disclosure will be described in detail based on the following figure, wherein.

DETAILED DESCRIPTION

Hereinafter, an exemplary embodiment of the present disclosure will be described in detail on the basis of the drawings.

(Image Forming Apparatus 10)

Figure 1:
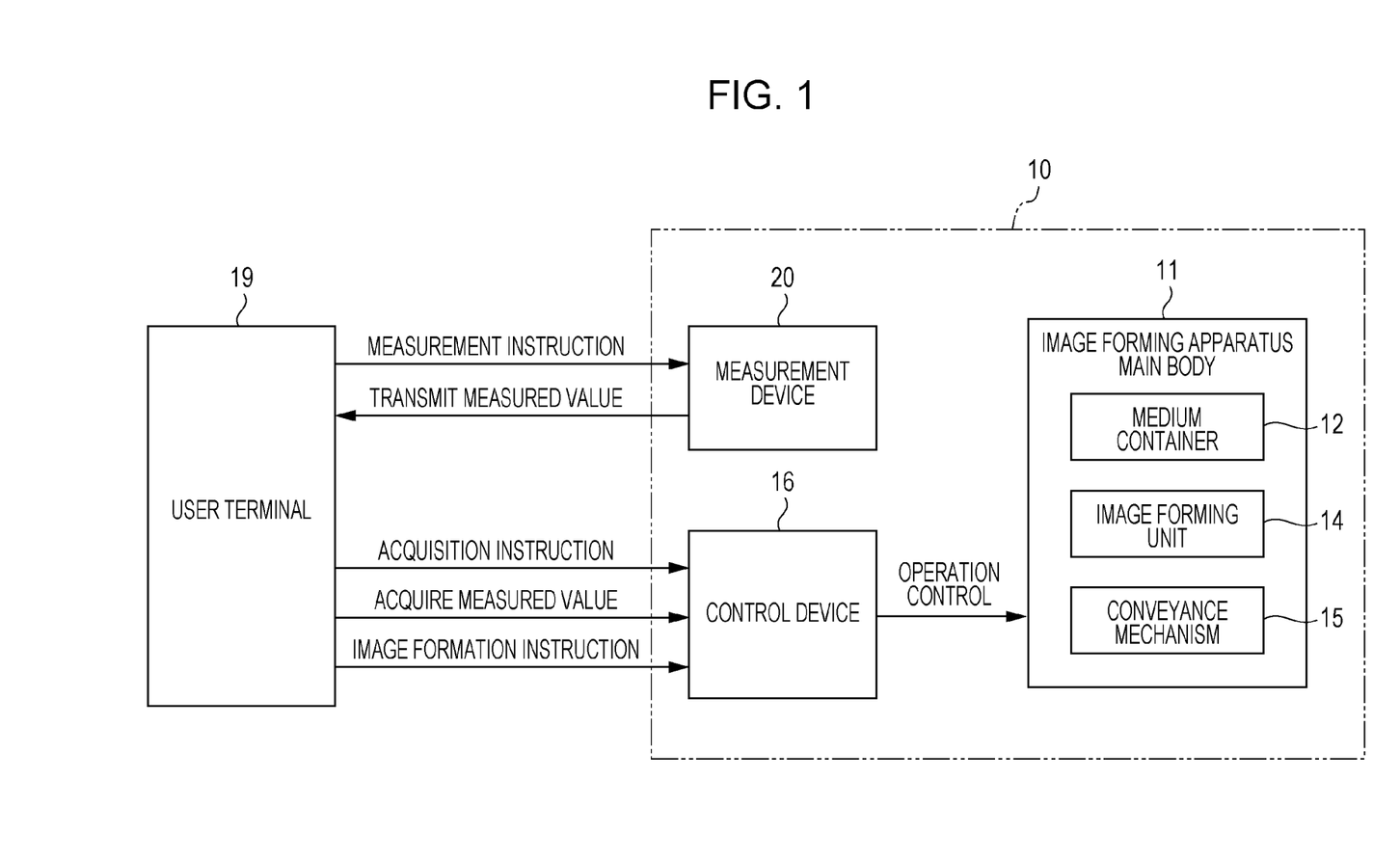
FIG. 1 is a block diagram illustrating a configuration of an image forming apparatus according to an exemplary embodiment.

A configuration of an image forming apparatus 10 according to the exemplary embodiment will be described. FIG. 1 is a block diagram illustrating a configuration of the image forming apparatus 10 according to the exemplary embodiment.

The image forming apparatus 10 illustrated in FIG. 1 is an apparatus that forms images. Specifically, as illustrated in FIG. 1, the image forming apparatus 10 is provided with an image forming apparatus main body 11, a medium container 12, an image forming unit 14, a conveyance mechanism 15, a control device 16, and a measurement device 20. The image forming apparatus 10 is capable of transmitting and receiving information with a user terminal 19. Hereinafter, each component of the image forming apparatus 10 will be described.

(Image Forming Apparatus Main Body 11)

The image forming apparatus main body 11 illustrated in FIG. 1 is a portion in which the components of the image forming apparatus 10 are provided. Specifically, the image forming apparatus main body 11 is a box-shaped housing, for example. In the exemplary embodiment, the medium container 12, the image forming unit 14, and the conveyance mechanism 15 are provided inside the image forming apparatus main body 11.

(Medium Container 12)

The medium container 12 illustrated in FIG. 1 is a portion that contains paper P in the image forming apparatus 10. The paper P contained in the medium container 12 is supplied to the image forming unit 14. Note that the paper P is one example of a "recording medium".

(Image Forming Unit 14)

The image forming unit 14 illustrated in FIG. 1 includes a function of forming an image on the paper P supplied from the medium container 12. Examples of the image forming unit 14 include an inkjet image forming unit that forms an image on the paper P using ink, and an electrophotographic image forming unit that forms an image on the paper P using toner.

In an inkjet image forming unit, an image is formed on the paper P by ejecting ink droplets from nozzles onto the paper P. In an inkjet image forming unit, an image may also be formed on the paper P by ejecting ink droplets from nozzles onto a transfer medium, and then transferring the ink droplets from the transfer medium to the paper P.

In an electrophotographic image forming unit, an image is formed on the paper P by performing the steps of charging, exposing, developing, transferring, and fusing, for example. In an electrophotographic image forming unit, an image may also be formed on the paper P by performing the charging, exposing, developing, and transferring steps to form an image on a transfer medium, transferring the image from the transfer medium to the paper P, and then fusing the image to the paper P.

Note that examples of the image forming unit are not limited to the inkjet image forming unit and the electrophotographic image forming unit described above, and any of various types of image forming units may be used.

(Conveyance Mechanism 15)

The conveyance mechanism 15 illustrated in FIG. 1 is a mechanism that conveys the paper P. As an example, the conveyance mechanism 15 conveys the paper P with conveyor members (not illustrated) such as conveyor rollers and conveyor belts. The conveyance mechanism 15 conveys the paper P from the medium container 12 to the image forming unit 14 along a predetermined conveyance path.

(Overview of User Terminal 19, Control Device 16, and Measurement Device 20)

The user terminal 19 illustrated in FIG. 1 is a terminal such as a smartphone, a tablet, or a personal computer, for example. The user terminal 19 is capable of communicating with the measurement device 20 and the control device 16 in a wired or wireless manner. As illustrated in FIG. 1, the measurement device 20 and the control device 16 are provided outside the image forming apparatus main body 11, for example. Note that each of the user terminal 19 and the control device 16 includes a control unit (control board) including a recording unit such as storage storing a program and a processor that operates according to the program.

In the exemplary embodiment, an operator (that is, a user) of the image forming apparatus 10 places desired paper P on which to form an image in the measurement device 20, and issues a measurement instruction from the user terminal 19, for example. The measurement device 20 acquires the measurement instruction from the user terminal 19, measures physical properties of the paper P, and transmits measured value information indicating measured values of the physical properties to the user terminal 19.

The operator (that is, the user) of the image forming apparatus 10 puts the paper P measured by the measurement device 20 into the medium container 12, and issues an acquisition instruction and an image formation instruction from the user terminal 19, for example. Note that the image formation instruction may also double as the acquisition instruction.

The control device 16 acquires the acquisition instruction from the user terminal 19 and acquires the measured value information from the user terminal 19. The control device 16 acquires the image formation instruction from the user terminal 19 and causes the image forming unit 14 and the conveyance mechanism 15 to execute image formation operations while also controlling the operations of the image forming unit 14 and the conveyance mechanism 15 on the basis of the measured value information. Specifically, the control device 16 controls settings such as the conveyance speed of the paper P in the conveyance mechanism 15 and also the transfer voltage and fusing temperature in the image forming unit 14 on the basis of the measured value information.

Note that in the example described above, the control device 16 is provided outside the image forming apparatus main body 11, but the control device 16 may also be provided inside the image forming apparatus main body 11. Additionally, the control device 16 acquires the measured value information from the measurement device 20 through the user terminal 19, but the control device 16 may also be configured to acquire the measured value information directly from the measurement device 20.

Furthermore, the measurement device 20 is provided outside the image forming apparatus main body 11, but the measurement device 20 may also be provided inside the image forming apparatus main body 11. Specifically, the measurement device 20 may also be configured as a device that measures physical properties in the medium container 12 or on the conveyance path of the paper P.

(Specific Configuration of Measurement Device 20)

Figure 2:
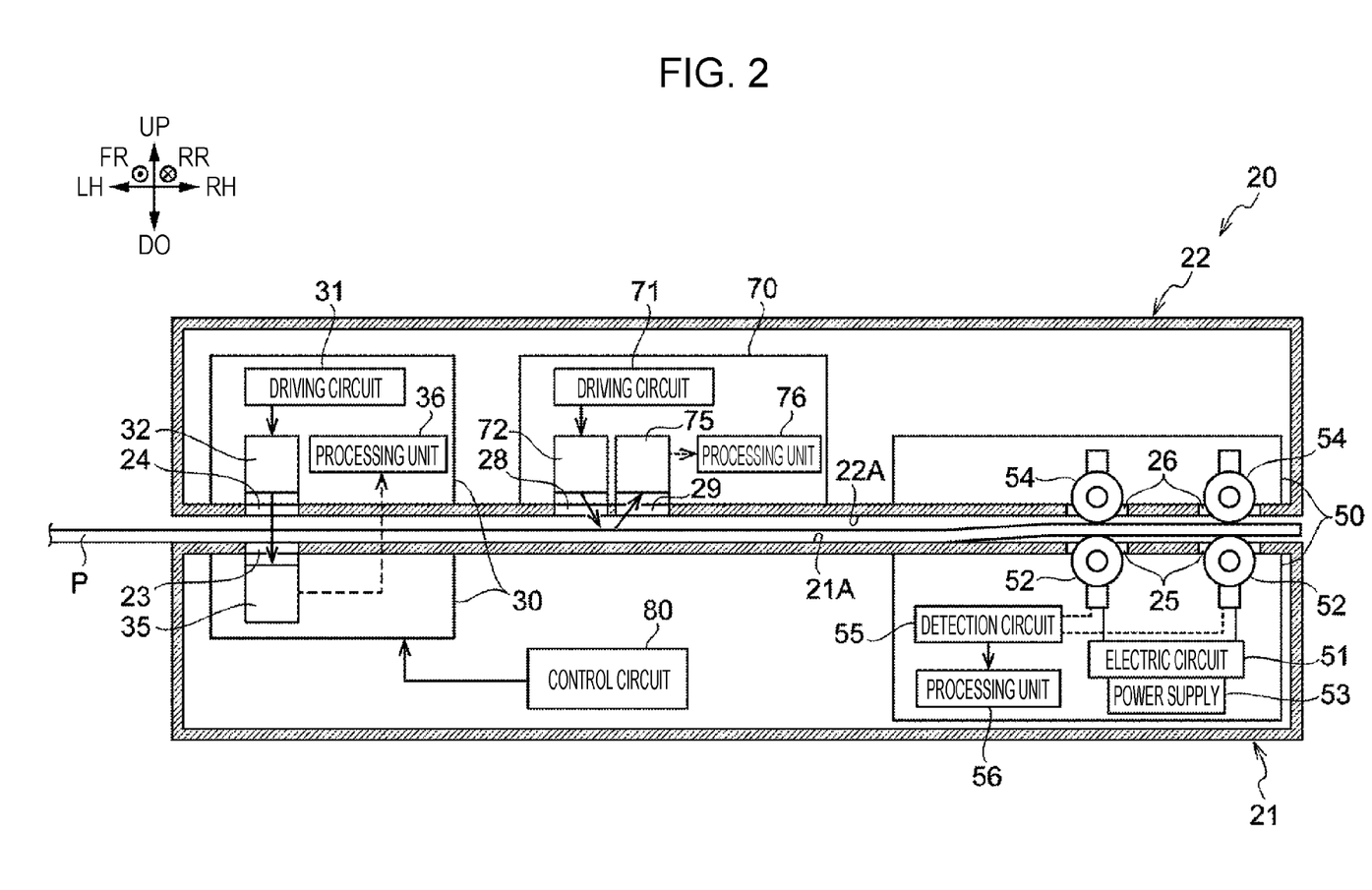
FIG. 2 is a schematic diagram illustrating a configuration of a measurement device according to the exemplary embodiment.

FIG. 2 is a schematic block diagram illustrating a configuration of the measurement device 20 according to the exemplary embodiment. Note that the arrow UP illustrated in the drawing indicates the upward (vertically upward) direction of the device, and the arrow DO indicates the downward (vertically downward) direction of the device. Also, the arrow LH illustrated in the drawing indicates the left-hand direction of the device, and the arrow RH indicates the right-hand direction of the device. Also, the arrow FR illustrated in the drawing indicates the forward direction of the direction, and the arrow RR indicates the rearward direction of the device. These directions have been defined for convenience in the following description, and the device configuration is not limited to these directions. Note that each direction of the device may be indicated while omitting the word "device" in some cases. In other words, for example, the "upward direction of the device" may simply be referred to as the "upward direction" in some cases.

Also, in the following description, the "vertical direction" is used to mean "both the upward direction and the downward direction" or "either the upward direction or the downward direction" in some cases. The "transverse direction" is used to mean "both the left-hand direction and the right-hand direction" or "either the left-hand direction or the right-hand direction" in some cases. The "transverse direction" may also be referred to as the horizontal or lateral direction. The "longitudinal direction" is used to mean "both the forward direction and the rearward direction" or "either the forward direction or the rearward direction" in some cases. The "longitudinal direction" may also be referred to as the horizontal or lateral direction. Also, the vertical direction, the transverse direction, and the longitudinal direction are mutually intersecting directions (specifically, orthogonal directions).

Also, the symbol of an "x" inside a circle "O" denotes an arrow going into the page. Also, the symbol of a dot "·" inside a circle "O" denotes an arrow coming out of the page.

The measurement device 20 is a device that measures physical properties of the paper P used in the image forming apparatus 10. Specifically, the measurement device 20 measures the basis weight, the electrical resistance, and the presence or absence of a coating layer of the paper P. Note that "measurement" means measuring a value (that is, the degree) of a physical property, and the value of a physical property is a concept that includes 0 (zero). In other words, "measurement" includes measuring whether or not the value of a physical property is 0 (zero), that is, measuring whether or not a physical property is present.

Specifically, as illustrated in FIG. 2, the measurement device 20 is provided with a first housing 21, a second housing 22, a basis weight measurement unit 30, a resistance measurement unit 50, and a coating layer measurement unit 70. Hereinafter, each unit of the measurement device 20 will be described.

(First Housing 21)

The first housing 21 is a portion in which some of the components of the measurement device 20 are provided. The first housing 21 forms the portion on the downward side of the measurement device 20. The first housing 21 has an opposing surface 21A that faces the bottom surface of the paper P. The opposing surface 21A is also a support surface that supports the paper P from underneath. Inside the first housing 21, a portion of the basis weight measurement unit 30 and a portion of the resistance measurement unit 50 are disposed.

(Second Housing 22)

The second housing 22 is a portion in which some other components of the measurement device 20 are provided. The second housing 22 forms the portion on the upward side of the measurement device 20. The second housing 22 has an opposing surface 22A that faces the top surface of the paper P. Inside the second housing 22, another portion of the basis weight measurement unit 30, the coating layer measurement unit 70, and another portion of the resistance measurement unit 50 are disposed. In the measurement device 20, the paper P given as one example of a measurement target is disposed between the first housing 21 and the second housing 22.

Note that the second housing 22 is configured to be movable relative to the first housing 21 in an approaching or retreating direction (specifically, the vertical direction), and after the paper P is disposed between the first housing 21 and the second housing 22, the second housing 22 is moved relatively in the direction approaching the first housing 21 and positioned at the position illustrated in FIG. 2.

(Resistance Measurement Unit 50)

The resistance measurement unit 50 illustrated in FIG. 2 includes a function of measuring the sheet resistance value [Ω] of the paper P. Specifically, as illustrated in FIG. 2, the resistance measurement unit 50 includes an electric circuit 51, a pair of terminals 52, a power supply 53, a pair of opposing members 54, a detection circuit 55, and a processing unit 56.

The pair of terminals 52 are disposed in the first housing 21, for example. The pair of terminals 52 are spaced from each other by an interval in the transverse direction, and contact the bottom surface of the paper P through an opening 25 formed in the first housing 21. Each of the pair of terminals 52 is electrically connected to the power supply 53 through the electric circuit 51.

Each of the pair of opposing members 54 opposes a corresponding one of the pair of terminals 52, with the paper P disposed between the pair of opposing members 54 and the pair of terminals 52. Each of the pair of opposing members 54 contacts the top surface of the paper P through an opening 26 formed in the second housing 22. In other words, the paper P is pinched between each of the pair of opposing members 54 and each of the pair of terminals 52. As an example, each of the pair of opposing members 54 and each of the pair of terminals 52 are configured as rollers.

The power supply 53 applies a predetermined voltage ([V]) to the pair of terminals 52 through the electric circuit 51. With this arrangement, a current corresponding to the sheet resistance of the paper P flows between the pair of terminals 52. The detection circuit 55 is electrically connected to the pair of terminals 52. The detection circuit 55 generates a detection signal by detecting the current flowing between the pair of terminals 52.

In this way, in the resistance measurement unit 50, the pair of terminals 52 and the detection circuit 55 form a detector (specifically, a detection sensor) that detects information (specifically, the current flowing through the paper P) indicating the sheet resistance of the paper P. The electric circuit 51 forms a circuit that drives the detector.

The processing unit 56 obtains a measured value (specifically, a current value [A]) by performing a process such as amplification on the detection signal acquired from the detection circuit 55. Furthermore, the processing unit 56 outputs measured value information indicating the obtained measured value to the user terminal 19. The processing unit 56 is configured by an electric circuit including an amplification circuit or the like, for example.

The measured value obtained by the processing unit 56 is a value correlated with the sheet resistance value of the paper P. Consequently, measurement in the resistance measurement unit 50 includes not only the case of measuring the sheet resistance value itself of the paper P, but also the case of measuring a measurement value correlated with the sheet resistance value of the paper P. Note that in the resistance measurement unit 50, the sheet resistance value of the paper P may also be calculated on the basis of the measured value obtained by the processing unit 56.

Note that the resistance measurement unit 50 is configured to obtain the sheet resistance value by applying a predetermined voltage to the pair of terminals 52 and detecting the current flowing between the pair of terminals 52, but is not limited thereto. For example, the resistance measurement unit 50 may also be configured to obtain the sheet resistance value by passing a current with a predetermined current value through the pair of terminals 52 and detecting the voltage across the pair of terminals 52.

In the exemplary embodiment, the resistance measurement unit 50 measures the sheet resistance value as the electrical resistance, but is not limited thereto. For example, the resistance measurement unit 50 may also be configured to measure the volume resistance or some other physical property of the paper P as the electrical resistance. Note that in the case of measuring the volume resistance of the paper P, one of the pair of terminals 52 is disposed on the top side of the paper P while the other is disposed on the bottom side of the paper P, such that the pair of terminals 52 pinch the paper P in the vertical direction.

(Coating Layer Measurement Unit 70)

The coating layer measurement unit 70 illustrated in FIG. 2 includes a function of measuring the presence or absence of a coating layer of the paper P. A coating layer is a layer formed by applying a coating agent to the surface of paper. In other words, the coating layer measurement unit 70 measures whether or not the paper P is paper with a coating (that is, coated paper). Specifically, as illustrated in FIG. 2, the coating layer measurement unit 70 includes a driving circuit 71, a light irradiation unit 72, a light reception unit 75, and a processing unit 76.

The light irradiation unit 72 includes a function of irradiating the paper P with light. The light irradiation unit 72 is disposed in the second housing 22. Namely, the light irradiation unit 72 is disposed at a position facing one surface (specifically, the top surface) of the paper P with a gap in between. Note that an opening 28 allowing the light from the light irradiation unit 72 to pass through to the paper P is formed underneath the light irradiation unit 72 in the second housing 22.

The driving circuit 71 is a circuit that drives the light irradiation unit 72. By causing the driving circuit 71 to drive the light irradiation unit 72, the light irradiation unit 72 irradiates the paper P with light, and the light reflects off the paper P.

The light reception unit 75 includes a function of receiving reflected light that has reflected off the paper P. The light reception unit 75 is disposed in the second housing 22. Namely, the light reception unit 75 is disposed at a position facing one surface (specifically, the top surface) of the paper P with a gap in between. The light reception unit 75 generates a light reception signal by receiving the reflected light that has reflected off the paper P. Note that an opening 29 allowing the light from the paper P to pass through to the light reception unit 75 is formed underneath the reception unit 75 in the second housing 22.

In this way, in the coating layer measurement unit 70, the light irradiation unit 72 and the light reception unit 75 form a detector (specifically, a detection sensor) that detects information (specifically, the reflected light reflected off the paper P) indicating the presence or absence of a coating layer of the paper P. The driving circuit 71 forms a circuit that drives the detector.

The processing unit 76 obtains a measured value by performing a process such as amplification on the light reception signal acquired from the light reception unit 75. Furthermore, the processing unit 76 outputs measured value information indicating the obtained measured value to the user terminal 19. The processing unit 76 is configured by an electric circuit including an amplification circuit or the like, for example.

The measured value obtained by the processing unit 76 is a value correlated with the presence or absence of a coating layer of the paper P. Consequently, measurement in the coating layer measurement unit 70 includes not only the case of measuring the presence or absence of a coating layer itself of the paper P, but also the case of measuring a measurement value correlated with the presence or absence of a coating layer of the paper P.

Note that in the coating layer measurement unit 70, the presence or absence of a coating layer of the paper P may also be measured on the basis of the measured value obtained by the processing unit 76. Specifically, the presence or absence of a coating layer is measured according to whether or not the measured value exceeds a predetermined threshold, for example.

(Basis Weight Measurement Unit 30)

The basis weight measurement unit 30 illustrated in FIG. 2 includes a function of measuring the basis weight [$g/m^2$] of the paper P by causing the paper P to vibrate through the application of an ultrasonic wave. The basis weight measurement unit 30 is an example of a "measurement unit". The paper P is an example of a "measurement target". The basis weight is an example of a "physical property", and is also an example of a "physical property value". Specifically, as illustrated in FIG. 2, the basis weight measurement unit 30 includes a driving circuit 31, an emission unit 32, a reception unit 35, and a processing unit 36.

The emission unit 32 includes a function of emitting an ultrasonic wave at the paper P. The emission unit 32 is disposed in the second housing 22. Namely, the emission unit 32 is disposed at a position facing one surface (specifically, the top surface) of the paper P. Note that an opening 24 allowing the ultrasonic wave from the emission unit 32 to pass through to the paper P is formed underneath the emission unit 32 in the second housing 22.

The driving circuit 31 is a circuit that drives the emission unit 32. By causing the driving circuit 31 to drive the emission unit 32, the emission unit 32 imparts an ultrasonic wave to the top surface of the paper P, causing the paper P to vibrate. The vibrating paper P causes air underneath the paper P to vibrate. In other words, the ultrasonic wave from the emission unit 32 is transmitted through the paper P.

The reception unit 35 includes a function of receiving the ultrasonic wave transmitted through the paper P. The reception unit 35 is disposed in the first housing 21. Namely, the reception unit 35 is disposed at a position facing the other surface (specifically, the bottom surface) of the paper P. The reception unit 35 generates a reception signal by receiving the ultrasonic wave transmitted through the paper P. Note that an opening 23 allowing the ultrasonic wave from the paper P to pass through to the reception unit 35 is formed above the reception unit 35 in the first housing 21.

In this way, in the basis weight measurement unit 30, the emission unit 32 and the reception unit 35 form a detector (specifically, a detection sensor) that detects information (specifically, the ultrasonic wave transmitted through the paper P) indicating the basis weight of the paper P. The driving circuit 31 forms a circuit that drives the detector.

The processing unit 36 obtains a measured value by performing a process such as amplification on the reception signal acquired from the reception unit 35. Furthermore, the processing unit 36 outputs measured value information indicating the obtained measured value to the user terminal 19. The processing unit 36 is configured by an electric circuit including an amplification circuit or the like, for example.

The measured value obtained by the processing unit 36 is a value correlated with the basis weight of the paper P. Consequently, measurement in the basis weight measurement unit 30 includes not only the case of measuring the basis weight itself of the paper P, but also the case of measuring a measurement value correlated with the basis weight of the paper P.

Note that in the basis weight measurement unit 30, the basis weight of the paper P may also be calculated on the basis of the measured value obtained by the processing unit 36. Specifically, the basis weight measurement unit 30 calculates the basis weight from correlation data indicating the correlation between the measured value and the basis weight, for example.

(Measurement Modes of Basis Weight Measurement Unit 30)

The basis weight measurement unit 30 includes multiple measurement modes. Specifically, the basis weight measurement unit 30 includes first, second, and third measurement modes. Each of the first, second, and third measurement modes is a mode that measures the basis weight using a burst wave sensitive in a predetermined range of basis weights.

The first measurement mode is a mode that measures the basis weight using a first burst wave sensitive in a range exceeding 300 [$g/m^2$] and up to 600 [$g/m^2$] (hereinafter referred to as the heavy basis weight range (see FIG. 4)), for example. In other words, the first measurement mode is a mode capable of measuring basis weights in the heavy basis weight range with higher precision than other basis weight ranges (specifically, a medium basis weight range and a light basis weight range described later).

For the first burst wave, the output of an ultrasonic wave (that is, vibrational energy) is set such that the first burst wave is sensitive in the heavy basis weight range. Consequently, the first burst wave has higher sensitivity in the heavy basis weight range compared to the sensitivity in the medium basis weight range and the light basis weight range described later. Note that a state of high sensitivity refers to a state in which there is a strong correlation between a measured value obtained by the processing unit 36 and the actual basis weight of the paper P.

Hereinafter, the first measurement mode will be referred to as the "heavy basis weight measurement mode". Note that the heavy basis weight measurement mode is an example of a "first mode". The heavy basis weight range is an example of a "first range".

The second measurement mode is a mode that measures the basis weight using a second burst wave sensitive in a range exceeding 100 [$g/m^2$] and up to 300 [$g/m^2$] (hereinafter referred to as the medium basis weight range (see FIG. 3)), for example. In other words, the second measurement mode is a mode capable of measuring basis weights in the medium basis weight range with higher precision than other basis weight ranges (specifically, the heavy basis weight range and a light basis weight range described later).

For the second burst wave, the output of an ultrasonic wave (that is, vibrational energy) is set such that the second burst wave is sensitive in the medium basis weight range. Consequently, the second burst wave has higher sensitivity in the medium basis weight range compared to the sensitivity in the heavy basis weight range and the light basis weight range described later. Note that the second burst wave is set to a lower output than the first burst wave in the heavy basis weight measurement mode. In other words, in the heavy basis weight measurement mode, the output of the burst wave is set higher than the second measurement mode. This is because in the heavy basis weight range, the paper P does not vibrate as readily as in the medium basis weight range, and consequently the signal (ultrasonic wave) received by the reception unit 35 is weak.

Hereinafter, the second measurement mode will be referred to as the "medium basis weight measurement mode". Note that the medium basis weight measurement mode is an example of a "second mode". The medium basis weight range is an example of a "second range".

The third measurement mode is a mode that measures the basis weight using a third burst wave sensitive in a range exceeding 0 [$g/m^2$] and up to 100 [$g/m^2$] (hereinafter referred to as the light basis weight range (see FIG. 5)), for example. In other words, the third measurement mode is a mode capable of measuring basis weights in the light basis weight range with higher precision than the other basis weight ranges (specifically, the heavy basis weight range and the medium basis weight range).

For the third burst wave, the output of an ultrasonic wave (that is, vibrational energy) is set such that the third burst wave is sensitive in the light basis weight range. Consequently, the third burst wave has higher sensitivity in the light basis weight range compared to the sensitivity in the heavy basis weight range and the medium basis weight range. Note that the third burst wave is set to a lower output than the second burst wave in the medium basis weight measurement mode. In other words, in the medium basis weight measurement mode, the output of the burst wave is set higher than the third measurement mode. This is because in the medium basis weight range, the paper P does not vibrate as readily as in the light basis weight range, and consequently the signal (ultrasonic wave) received by the reception unit 35 is weak.

Hereinafter, the third measurement mode will be referred to as the "light basis weight measurement mode". Note that the light basis weight measurement mode is an example of a "third mode". The light basis weight range is an example of a "third range".

Figure 3:
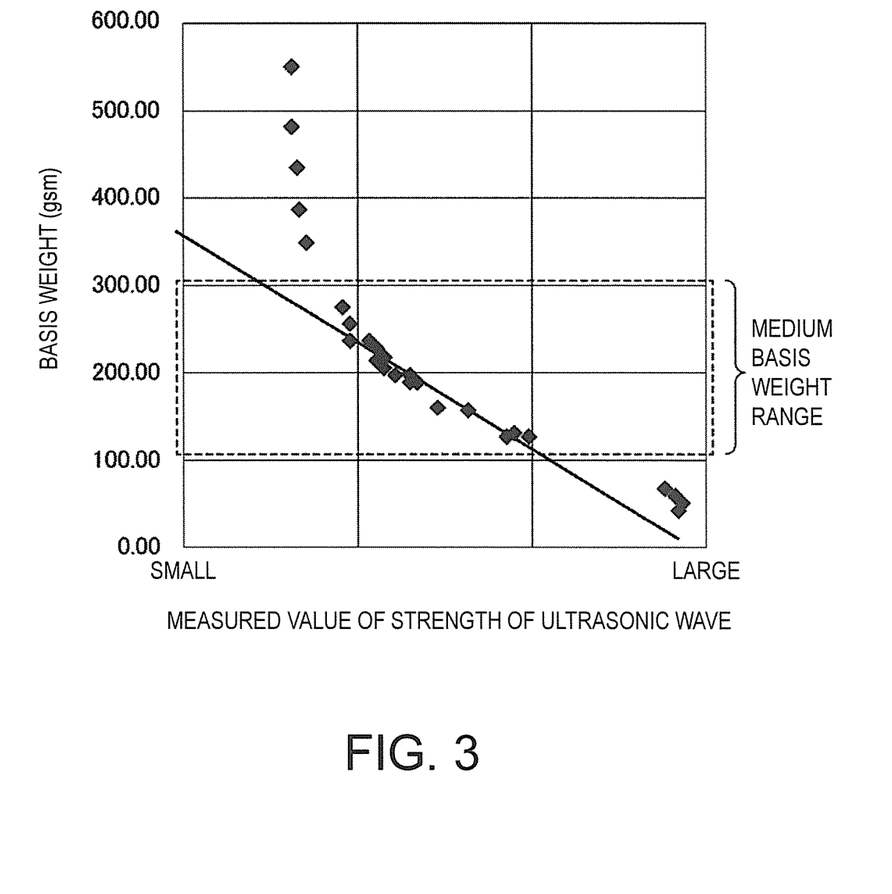
FIG. 3 is a graph illustrating a correlation between a measured value obtained by a processing unit and an actual measurement value in a medium basis weight measurement mode according to the exemplary embodiment.
Figure 4:
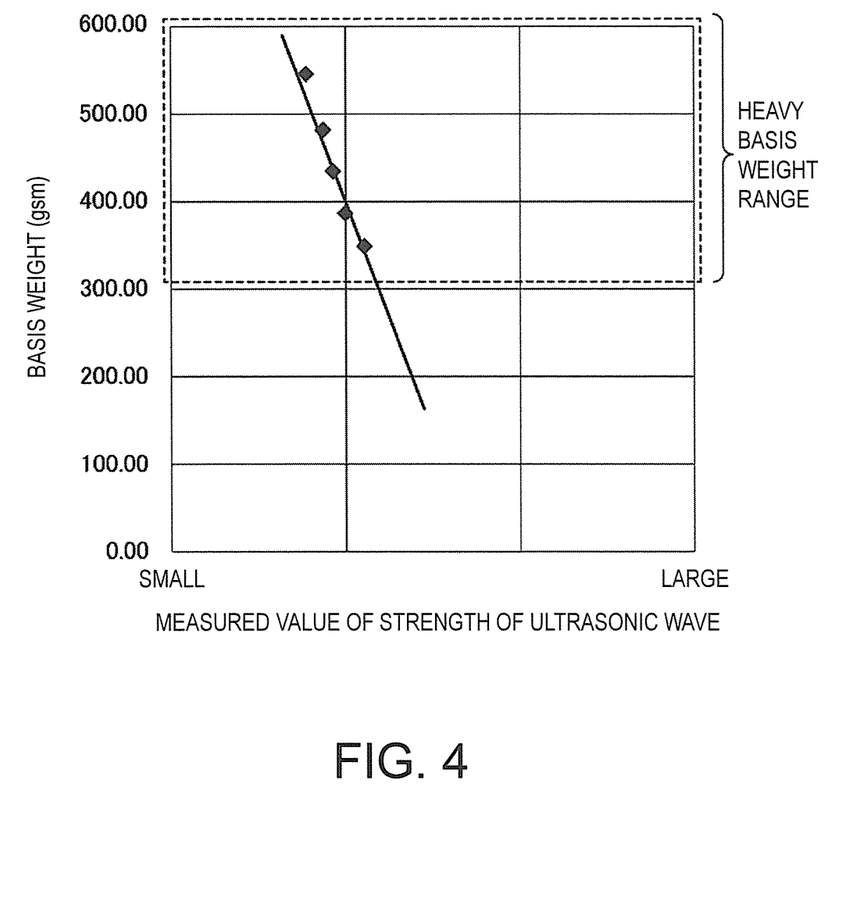
FIG. 4 is a graph illustrating a correlation between a measured value obtained by a processing unit and an actual measurement value in a heavy basis weight measurement mode according to the exemplary embodiment.
Figure 5:
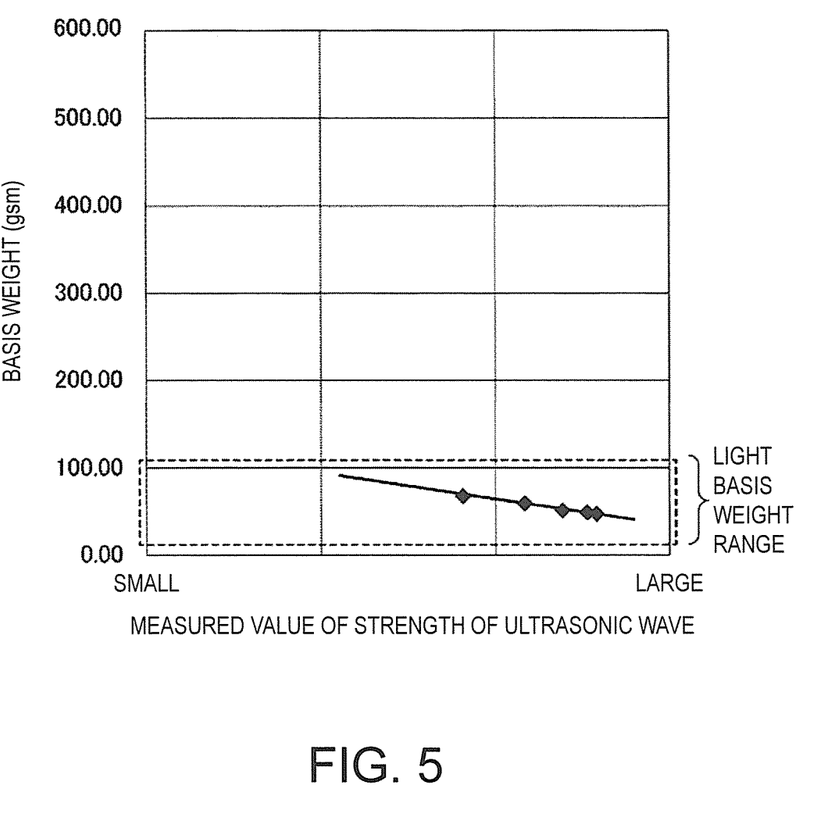
FIG. 5 is a graph illustrating a correlation between a measured value obtained by a processing unit and an actual measurement value in a light basis weight measurement mode according to the exemplary embodiment.

Here, FIG. 3 is a graph illustrating a correlation between measured values obtained by the processing unit 36 (hereinafter simply referred to as the "measured value"; see the solid line) and actual basis weights of the paper P (hereinafter referred to as the "actual measurement value"; see the plotted points) in the medium basis weight measurement mode that measures the basis weight using the second burst wave. FIG. 4 is a graph illustrating a correlation between the measured value (solid line) and the actual measurement value of the basis weight (plotted points) in the heavy basis weight measurement mode that measures the basis weight using the first burst wave. FIG. 5 is a graph illustrating a correlation between the measured value (solid line) and the actual measurement value of the basis weight (plotted points) in the light basis weight measurement mode that measures the basis weight using the third burst wave.

As illustrated in FIG. 3, in the medium basis weight measurement mode, the correlation between the measured value (solid line) and the actual measurement value of the basis weight (plotted points) in the medium basis weight range is relatively higher compared to the correlation in the heavy basis weight range and the light basis weight range. In other words, in the medium basis weight measurement mode, the coincidence ratio between the measured value and the actual measurement value in the medium basis weight range is higher than the coincidence ratio between the measured value and the actual measurement value in the heavy basis weight range and the light basis weight range.

In contrast, as illustrated in FIG. 4, the correlation between the measured value (solid line) and the actual measurement value of the basis weight (plotted points) in the heavy basis weight range in the heavy basis weight measurement mode is relatively higher compared to the correlation in the heavy basis weight range in the medium basis weight measurement mode. In other words, the coincidence ratio between the measured value and the actual measurement value in the heavy basis weight range in the heavy basis weight measurement mode is higher than the coincidence ratio between the measured value and the actual measurement value in the heavy basis weight range in the medium basis weight measurement mode. Note that, although not illustrated in FIG. 4, the coincidence ratio between the measured value and the actual measurement value in the heavy basis weight range in the heavy basis weight measurement mode is higher than the coincidence ratio between the measured value and the actual measurement value in the medium basis weight range and the light basis weight range in the heavy basis weight measurement mode.

Also, as illustrated in FIG. 5, the correlation between the measured value (solid line) and the actual measurement value of the basis weight (plotted points) in the light basis weight range in the light basis weight measurement mode is relatively higher compared to the correlation in the light basis weight range in the medium basis weight measurement mode. In other words, the coincidence ratio between the measured value and the actual measurement value in the light basis weight range in the light basis weight measurement mode is higher than the coincidence ratio between the measured value and the actual measurement value in the light basis weight range in the medium basis weight measurement mode. Note that, although not illustrated in FIG. 5, the coincidence ratio between the measured value and the actual measurement value in the light basis weight range in the light basis weight measurement mode is higher than the coincidence ratio between the measured value and the actual measurement value in the heavy basis weight range and the medium basis weight range in the light basis weight measurement mode.

(Control Circuit 80)

Figure 6:
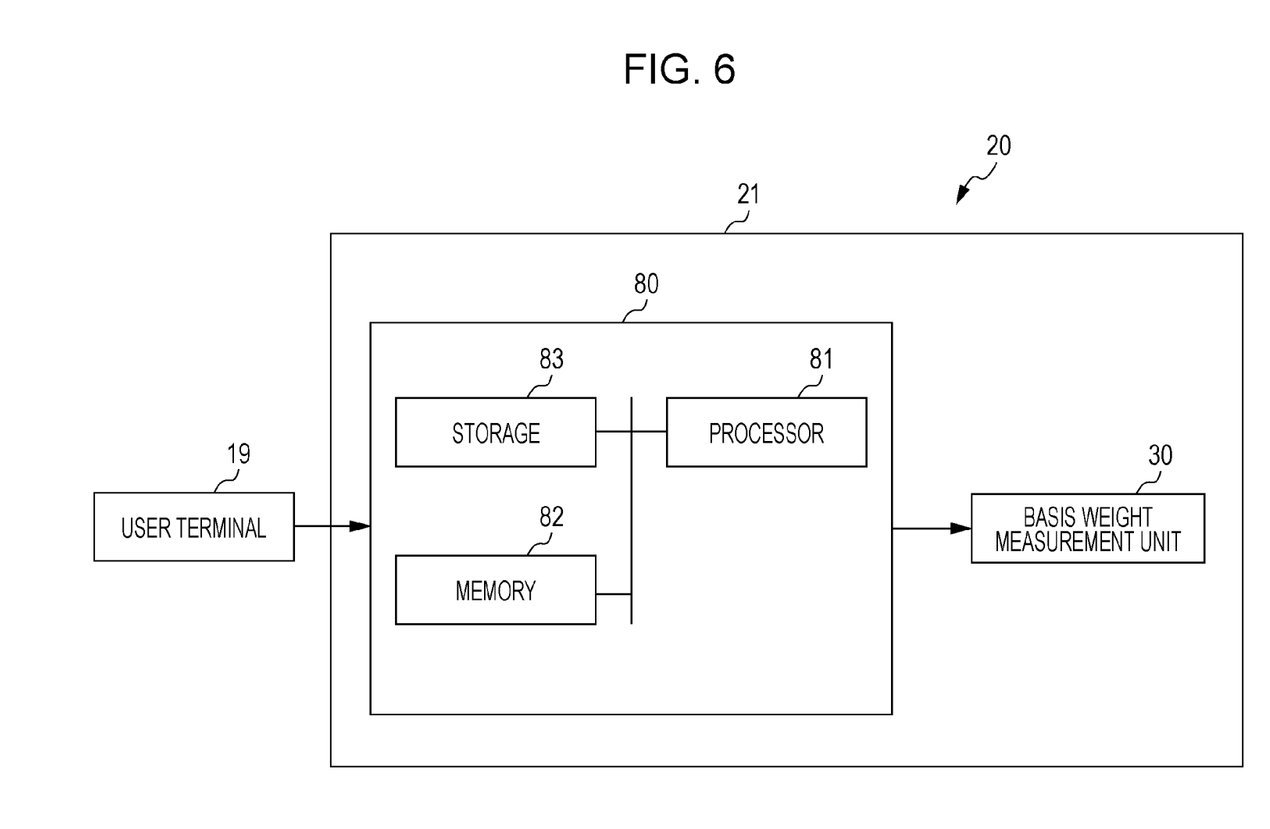
FIG. 6 is a block diagram illustrating an example of a hardware configuration of a control circuit according to the exemplary embodiment.

The control circuit 80 includes a control function that controls operations by the basis weight measurement unit 30. Specifically, as illustrated in FIG. 6, the control circuit 80 includes a processor 81, a memory 82, and storage 83.

The term "processor" refers to hardware in a broad sense, and examples of the processor 81 include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

The storage 83 stores various programs, including a control program 83A (see FIG. 7), and various data. The storage 83 is achieved specifically by a recording device such as a hard disk drive (HDD), a solid-state drive (SSD), or flash memory.

The memory 82 is a work area that the processor 81 uses to execute various programs, and temporarily records various programs or various data when the processor 81 executes a process. The processor 81 reads out various programs including the control program 83A from the storage 83 into the memory 82, and executes the programs using the memory 82 as a work area.

Figure 7:
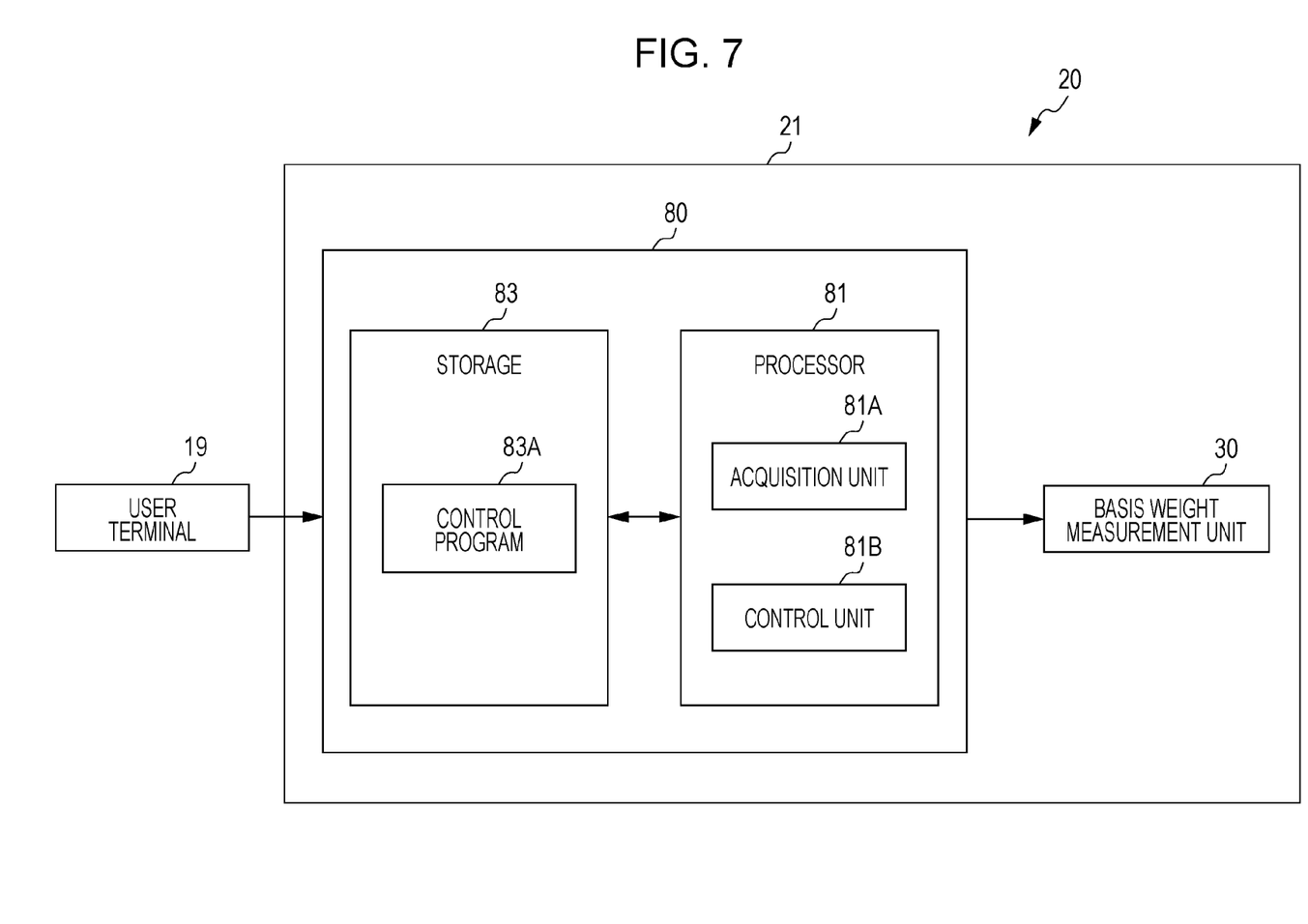
FIG. 7 is a block diagram illustrating an example of a functional configuration of a processor of the control circuit according to the exemplary embodiment.

In the control circuit 80, the processor 81 achieves various functions by executing the control program 83A. Hereinafter, a functional configuration achieved through the cooperation between the processor 81 acting as a hardware resource and the control program 83A acting as a software resource will be described. FIG. 7 is a block diagram illustrating a functional configuration of the processor 81.

As illustrated in FIG. 7, in the control circuit 80, the processor 81 executes the control program 83A to thereby function as an acquisition unit 81A and a control unit 81B. The acquisition unit 81A acquires a measurement instruction for measuring the basis weight of the paper P from the user terminal 19.

When the acquisition unit 81A acquires the measurement instruction, the control unit 81B controls the basis weight measurement unit 30 to measure the basis weight. In the measurement control, the control unit 81B causes at least one of the heavy basis weight measurement mode, the medium basis weight measurement mode, and the light basis weight measurement mode to be executed.

Specifically, in the measurement control according to the exemplary embodiment, the control unit 81B first causes the medium basis weight measurement mode to be executed. In the case where the basis weight of the paper P measured by the medium basis weight measurement mode is included in the medium basis weight range, the control unit 81B uses the basis weight of the paper P measured by the medium basis weight measurement mode as the measured value (measurement result), and does not cause the light basis weight measurement mode or the heavy basis weight measurement mode to be executed. In other words, in the case where the basis weight of the paper P measured by the medium basis weight measurement mode is included in the medium basis weight range, the control unit 81B ends the process without executing the light basis weight measurement mode or the heavy basis weight measurement mode.

Additionally, in the case where the basis weight of the paper P measured by the medium basis weight measurement mode is not included in the medium basis weight range, the control unit 81B causes at least one of the heavy basis weight measurement mode and the light basis weight measurement mode to be executed. Specifically, in the exemplary embodiment, in the case where the basis weight of the paper P measured by the medium basis weight measurement mode is not included in the medium basis weight range, the control unit 81B causes the heavy basis weight measurement mode to be executed if the basis weight is heavier than the medium basis weight range, and causes the light basis weight measurement mode to be executed if the basis weight is lighter than the medium basis weight range.

In the case of causing at least one of the heavy basis weight measurement mode and the light basis weight measurement mode to be executed after causing the medium basis weight measurement mode to be executed, the control unit 81B causes at least one of the heavy basis weight measurement mode and the light basis weight measurement mode to be executed after stopping the application of the ultrasonic wave in the basis weight measurement unit 30. In other words, in the case where the basis weight of the paper P is not included in the medium basis weight range, the control unit 81B causes at least one of the heavy basis weight measurement mode and the light basis weight measurement mode to be executed after stopping the application of the ultrasonic wave in the basis weight measurement unit 30.

In the exemplary embodiment, the control circuit 80 is an example of a "control unit". Note that the processor 81 or the control unit 81B may also be understood as an example of a "control unit".

(Action According to Exemplary Embodiment)

Figure 8:
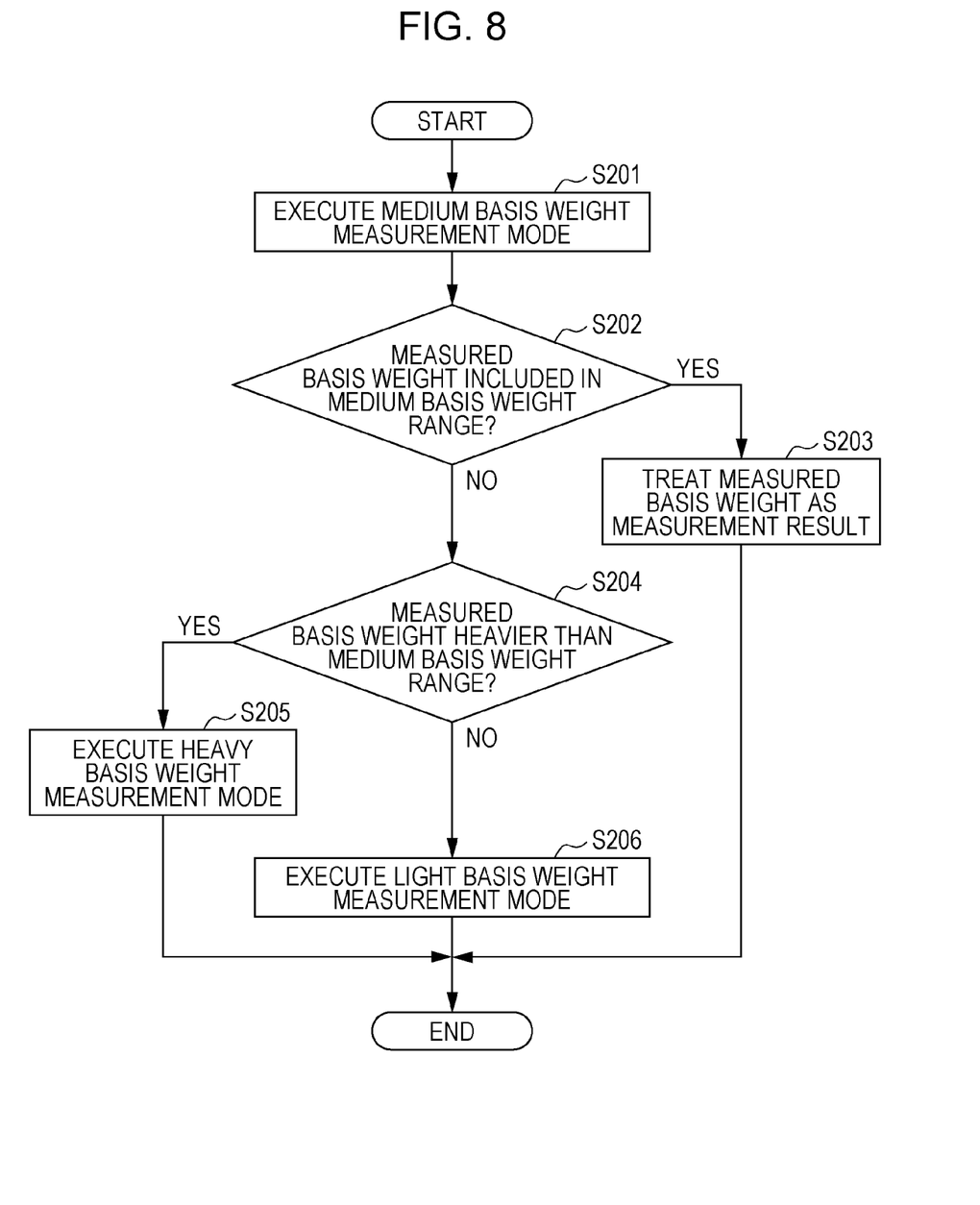
FIG. 8 is a flowchart illustrating a flow of a control process according to the exemplary embodiment.

Next, an example of the action of the exemplary embodiment will be described. FIG. 8 is a flowchart illustrating the flow of a control process executed by the control circuit 80.

The process is performed by having the processor 81 read out and execute the control program 83A from the storage 83. For example, the execution of the process is started when the processor 81 acquires a measurement instruction from the user terminal 19.

As illustrated in FIG. 8, first, the processor 81 causes the basis weight measurement unit 30 to execute the medium basis weight measurement mode (step S201). Next, the processor 81 determines whether or not the basis weight of the paper P measured by the medium basis weight measurement mode is included in the medium basis weight range (step S202). In the case of determining that the basis weight is included in the medium basis weight range (step S202: YES), the processor 81 uses the basis weight of the paper P measured by the medium basis weight measurement mode as the measurement result (step S203), and ends the process. In other words, in the case of determining that the basis weight is included in the medium basis weight range (step S202: YES), the processor 81 ends the process without causing the basis weight measurement unit 30 to execute the heavy basis weight measurement mode or the light basis weight measurement mode.

In the case of determining that the basis weight is not included in the medium basis weight range (step S202: NO), the processor 81 determines whether or not the basis weight is heavier than the medium basis weight range (step S204).

In the case of determining that the basis weight is heavier than the medium basis weight range (step S204: YES), the processor 81 causes the basis weight measurement unit 30 to execute the heavy basis weight measurement mode (step S205), and ends the process. Note that in step S205, the processor 81 causes the heavy basis weight measurement mode to be executed after stopping the application of the ultrasonic wave in the basis weight measurement unit 30. In other words, the state in which the second burst wave is applied to the paper P as the ultrasonic wave is stopped, and then the state in which the first burst wave is applied to the paper P as the ultrasonic wave is started. Also, in step S205, the basis weight of the paper P measured by the heavy basis weight measurement mode is used as the measurement result.

On the other hand, in the case of determining that the basis weight is not heavier than the medium basis weight range (step S204: NO), the processor 81 causes the basis weight measurement unit 30 to execute the light basis weight measurement mode (step S206), and ends the process. In other words, in the case of determining that the basis weight is lighter than the medium basis weight range, the processor 81 causes the basis weight measurement unit 30 to execute the light basis weight measurement mode (step S206), and ends the process. Note that in step S206, the processor 81 causes the light basis weight measurement mode to be executed after stopping the application of the ultrasonic wave in the basis weight measurement unit 30. In other words, the state in which the second burst wave is applied to the paper P as the ultrasonic wave is stopped, and then the state in which the third burst wave is applied to the paper P as the ultrasonic wave is started. Also, in step S206, the basis weight of the paper P measured by the light basis weight measurement mode is used as the measurement result.

As above, the exemplary embodiment includes the heavy basis weight measurement mode that measures the basis weight using the first burst wave sensitive in the heavy basis weight range, the medium basis weight measurement mode that measures the basis weight using the second burst wave sensitive in the medium basis weight range, and the light basis weight measurement mode that measures the basis weight using the third burst wave sensitive in the light basis weight range. In other words, in the exemplary embodiment, when measuring the basis weight of the paper P, it is possible to measure the basis weight using multiple types of burst waves. Consequently, when measuring the basis weight of the paper P, it is possible to measure the basis weight of the paper P with high precision compared to a configuration that only uses a single type of burst wave.

Specifically, in the exemplary embodiment, when measuring the basis weight of the paper P, it is possible to measure the basis weight using three types of burst waves. Consequently, when measuring the basis weight of the paper P, it is possible to measure the basis weight of the paper P with high precision compared to a configuration that only uses two types of burst wave.

Also, in the exemplary embodiment, in the case where the basis weight of the paper P measured by the medium basis weight measurement mode is not included in the medium basis weight range (step S202: NO), the processor 81 causes at least one of the heavy basis weight measurement mode and the light basis weight measurement mode to be executed. Specifically, in the case where the basis weight of the paper P measured by the medium basis weight measurement mode is not included in the medium basis weight range (step S202: NO), the processor 81 causes the heavy basis weight measurement mode to be executed (step S205) if the basis weight is heavier than the medium basis weight range (step S204: YES), and causes the light basis weight measurement mode to be executed (step S206) if the basis weight is lighter than the medium basis weight range (step S204: NO).

Consequently, in the case where the basis weight of the paper P measured by the medium basis weight measurement mode is not included in the medium basis weight range (step S202: NO), it is possible to measure the basis weight of the paper P with high precision compared to a configuration in which the processor 81 ends the process without executing either of the heavy basis weight measurement mode and light basis weight measurement mode.

Also, in step S205 of the exemplary embodiment, the processor 81 causes the heavy basis weight measurement mode to be executed after stopping the application of the ultrasonic wave in the basis weight measurement unit 30. In other words, the state in which the second burst wave is applied to the paper P as the ultrasonic wave is stopped, and then the state in which the first burst wave is applied to the paper P as the ultrasonic wave is started.

Here, with a configuration that changes from the second burst wave to the first burst wave while continuously applying the ultrasonic wave to the paper P (hereinafter referred to as Configuration A), it may take time for the second burst wave to stabilize into the first burst wave. Consequently, the measurement time for measuring the basis weight of the paper P is shortened compared to Configuration A.

Note that in step S206 of the exemplary embodiment, the processor 81 causes the light basis weight measurement mode to be executed after stopping the application of the ultrasonic wave in the basis weight measurement unit 30. With this configuration, similarly to the case described above, the measurement time for measuring the basis weight of the paper P is shortened compared to a configuration that changes from the second burst wave to the third burst wave while continuously applying the ultrasonic wave to the paper P.

Also, in the exemplary embodiment, in the case of determining that the basis weight of the paper P measured by the medium basis weight measurement mode is included in the medium basis weight range (step S202: YES), the processor 81 ends the process without causing the basis weight measurement unit 30 to execute the heavy basis weight measurement mode or the light basis weight measurement mode.

Consequently, the measurement time for measuring the basis weight of the paper P is shortened compared to a configuration that always causes the heavy basis weight measurement mode and the light basis weight measurement mode to be executed after executing the medium basis weight measurement mode.

Also, in the exemplary embodiment as described above, in the case where the basis weight of the paper P measured by the medium basis weight measurement mode is not included in the medium basis weight range (step S202: NO), the processor 81 causes the heavy basis weight measurement mode to be executed (step S205) if the basis weight is heavier than the medium basis weight range (step S204: YES), and causes the light basis weight measurement mode to be executed (step S206) if the basis weight is lighter than the medium basis weight range (step S204: NO).

In this way, in the exemplary embodiment, by executing the medium basis weight measurement mode first, in the case where the measured basis weight of the paper P is not included in the medium basis weight range (step S202: NO), a mode is selected appropriately by determining which mode to execute next according to whether the basis weight is heavier or lighter than the medium basis weight range.

For example, if the heavy basis weight measurement mode is executed first and the measured basis weight of the paper P is not included in the heavy basis weight range, it may not be possible to determine whether to select the medium basis weight measurement mode or the light basis weight measurement mode next unless one ascertains how much lighter the basis weight is compared to the heavy basis weight range.

Consequently, according to the exemplary embodiment, it is possible to measure the basis weight of the paper P in a short time and with high precision compared to a configuration that executes the heavy basis weight measurement mode or the light basis weight measurement mode first and then executes the other two modes.

Also, in the exemplary embodiment, the control device 16 acquires the image formation instruction from the user terminal 19 and causes the image forming unit 14 and the conveyance mechanism 15 to execute image formation operations while also controlling the operations of the image forming unit 14 and the conveyance mechanism 15 on the basis of the measured value information. Consequently, a high-quality image is formed on the paper P compared to a configuration in which the image forming operations are executed irrespectively of the physical properties of the paper P.

(Exemplary Modifications)

In the exemplary embodiment, a recording medium is used as an example of the measurement target, but the measurement target is not limited thereto. As an example of the measurement target, a target used for a purpose other than forming an image may also be used. Also, in the exemplary embodiment, the paper P is used as an example of a recording medium, but the recording medium is not limited thereto. As an example of the recording medium, a sheet-like recording medium other than the paper P, such as a metal or plastic film, may also be used.

Also, in the exemplary embodiment, the basis weight measurement unit 30 that measures the basis weight [g/m$^2$] of the paper P is used as an example of a measurement unit, but the measurement unit is not limited thereto. As an example of the measurement unit, a measurement unit that measures the thickness [m], the density [g/m$^3$], the mass [g], or some other physical property of a measurement target may also be used. In other words, as an example of a physical property, the thickness [m], the density [g/m$^3$], the mass [g], or some other physical property of a measurement target may also be used, for example.

Also, in the exemplary embodiment, the basis weight measurement unit 30 includes the three measurement modes of the heavy basis weight measurement mode, the medium basis weight measurement mode, and the light basis weight measurement mode, but is not limited thereto. For example, the basis weight measurement unit 30 may also include the two measurement modes of the heavy basis weight measurement mode and the medium basis weight measurement mode, and at least two measurement modes are sufficient.

Also, in step S205 of the exemplary embodiment, the processor 81 causes the heavy basis weight measurement mode to be executed after stopping the application of the ultrasonic wave in the basis weight measurement unit 30, but the configuration is not limited thereto. For example, a configuration that changes from the second burst wave to the first burst wave while continuously applying the ultrasonic wave to the paper P is also possible.

Also, in step S206 of the exemplary embodiment, the processor 81 causes the light basis weight measurement mode to be executed after stopping the application of the ultrasonic wave in the basis weight measurement unit 30, but the configuration is not limited thereto. For example, a configuration that changes from the second burst wave to the third burst wave while continuously applying the ultrasonic wave to the paper P is also possible.

Also, in the exemplary embodiment, in the case of determining that the basis weight of the paper P measured by the medium basis weight measurement mode is included in the medium basis weight range (step S202: YES), the processor 81 ends the process without causing the basis weight measurement unit 30 to execute the heavy basis weight measurement mode or the light basis weight measurement mode, but the configuration is not limited thereto. For example, a configuration that always causes the heavy basis weight measurement mode and the light basis weight measurement mode to be executed after executing the medium basis weight measurement mode is also possible.

Also, in the exemplary embodiment, in the case where the basis weight of the paper P measured by the medium basis weight measurement mode is not included in the medium basis weight range (step S202: NO), the processor 81 causes the heavy basis weight measurement mode to be executed (step S205) if the basis weight is heavier than the medium basis weight range (step S204: YES), and causes the light basis weight measurement mode to be executed (step S206) if the basis weight is lighter than the medium basis weight range (step S204: NO), but the configuration is not limited thereto. For example, a configuration that executes the heavy basis weight measurement mode or the light basis weight measurement mode first and then executes the other two modes is also possible.

In the exemplary embodiment, the measurement device 20 is provided with the resistance measurement unit 50 and the coating layer measurement unit 70, but is not limited thereto. For example, the measurement device 20 may also be provided with at least one of the resistance measurement unit 50 and the coating layer measurement unit 70, but is sufficiently provided with at least the basis weight measurement unit 30.

The present disclosure is not limited to the exemplary embodiment above, and various modifications, alterations, and improvements are possible without deviating from the gist of the present disclosure. For example, the configurations included in the exemplary modifications described above may also be plurally combined where appropriate.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A measurement device comprising:
    a detector configured to detect an ultrasonic wave transmitted through a measurement target;
    a driving circuit configured to drive the detector;
    a processing circuit configured to:
    measure a basis weight of a measurement target by causing the measurement target to vibrate through an application of the ultrasonic wave, measure a strength of the ultrasonic wave detected by the detector, and calculate the basis weight of the measurement target on a basis of a measured value of the strength of the ultrasonic wave from a correlation data indicating a correlation between the measured value and the basis weight, the driving circuit including a first mode that measures the basis weight using a first burst wave sensitive in a first predetermined range of basis weight values and a second mode that measures the basis weight using a second burst wave sensitive in a second range of basis weight values different from the first range; and
    a control circuit that controls the driving circuit to execute at least one of the first mode and the second mode, wherein
    the control circuit controls the driving circuit to execute the second mode, and if the basis weight measured by the second mode is not included in the second range, the control circuit controls the driving circuit to execute the first mode after stopping the application of the ultrasonic wave.

2. The measurement device according to claim 1, wherein:
    the control circuit controls the driving circuit not to execute the first mode in a case where the basis weight of the measurement target measured by the second mode is included in the second range.

3. The measurement device according to claim 2, wherein:
    the driving circuit further includes a third mode that measures the basis weight using a third burst wave sensitive in a third range of basis weight values different from the first range and the second range, and the control circuit controls the driving circuit to execute at least one of the first mode, the second mode, and the third mode.

4. The measurement device according to claim 3, wherein:
    the second range is a range of basis weight values lower than the first range and also higher than the third range, and
    the control circuit controls the driving circuit to execute the second mode, and if the basis weight measured by the second mode has a basis weight value higher than the second range, the control circuit controls the driving circuit to execute the first mode, whereas if the basis weight measured by the second mode has a basis weight value lower than the second range, the control circuit controls the driving circuit to execute the third mode.

5. The measurement device according to claim 1, wherein:
    the driving circuit further includes a third mode that measures the basis weight using a third burst wave sensitive in a third range of basis weight values different from the first range and the second range, and
    the control circuit controls the driving circuit to execute at least one of the first mode, the second mode, and the third mode.

6. The measurement device according to claim 5, wherein:
    the second range is a range of basis weight values lower than the first range and also higher than the third range, and
    the control circuit controls the driving circuit to execute the second mode, and if the basis weight measured by the second mode has a basis weight value higher than the second range, the control circuit controls the driving circuit to execute the first mode, whereas if the basis weight measured by the second mode has a basis weight value lower than the second range, the control circuit controls the driving circuit to execute the third mode.

7. An image forming apparatus comprising:
    the measurement device according to claim 1;
    an image forming circuit that forms an image on a recording medium treated as the measurement target for which the basis weight is measured by the measurement device; and
    a control device that controls an image forming operation by the image forming circuit on a basis of the basis weight measured by the measurement device.

8. A measurement device comprising:
    a detecting means for detecting an ultrasonic wave transmitted through a measurement target;
    a driving means for driving the detector;
    a processing means for measuring a basis weight of a measurement target by causing the measurement target to vibrate through an application of the ultrasonic wave, measuring a strength of the ultrasonic wave detected by the detector, and calculating the basis weight of the measurement target on a basis of a measured value of the strength of the ultrasonic wave from a correlation data indicating a correlation between the measured value and the basis weight, the driving means including a first mode that measures the basis weight using a first burst wave sensitive in a first predetermined range of basis weight values and a second mode that measures the basis weight using a second burst wave sensitive in a second range of basis weight values different from the first range; and a controlling means for controlling the driving means to execute at least one of the first mode and the second mode, wherein the controlling means controls the driving means to execute the second mode, and if the basis weight measured by the second mode is not included in the second range, the controlling means controls the driving means to execute the first mode after stopping the application of the ultrasonic wave.

* * * * *